(12) United States Patent
Weingaertner (10) Patent No.: US 11,628,528 B2
(45) Date of Patent: Apr. 18, 2023

(54) MACHINING UNIT FOR MACHINING WORKPIECES

(71) Applicant: AFW Holding GmbH, Osterreich (AT)

(72) Inventor: Dominik Weingaertner, Pettenbach (AT)

(73) Assignee: AFW Holding GmbH, Osterreich (AT)

( * ) Notice: Subject to any disclaimer, the term of this patent is extended or adjusted under 35 U.S.C. 154(b) by 42 days.

(21) Appl. No.: 16/318,185

(22) PCT Filed: Jun. 12, 2017

(86) PCT No.: PCT/EP2017/064306
§ 371 (c)(1),
(2) Date: Jan. 16, 2019

(87) PCT Pub. No.: WO2018/015068
PCT Pub. Date: Jan. 25, 2018

(65) Prior Publication Data
US 2019/0232444 A1  Aug. 1, 2019

(30) Foreign Application Priority Data

Jul. 20, 2016  (EP) ..................... 16180394

(51) Int. Cl.
*B23Q 1/44* (2006.01)
*B23Q 1/62* (2006.01)
*B23Q 5/36* (2006.01)

(52) U.S. Cl.
CPC .............. *B23Q 1/445* (2013.01); *B23Q 1/62* (2013.01); *B23Q 5/36* (2013.01)

(58) Field of Classification Search
CPC . B23Q 1/44; B23Q 1/445; B23Q 1/62; B23Q 5/36; B23Q 5/38; B23Q 1/26;
(Continued)

(56) References Cited

U.S. PATENT DOCUMENTS 2,221,127 A * 11/1940 Bates ................. B23F 23/12
409/11
5,311,791 A * 5/1994 Yanagisawa .......... B23Q 1/621
108/143
(Continued)

FOREIGN PATENT DOCUMENTS

CN    1712163 A    12/2005
DE    703369 C     3/1941
(Continued)

OTHER PUBLICATIONS

English translation of DE 102008033709 A1. (Year: 2010).*
(Continued)

*Primary Examiner* — Alan Snyder
(74) *Attorney, Agent, or Firm* — KDW Firm PLLC (57) ABSTRACT

A machining unit for machining, in particular turning and/or milling, workpieces, in particular elongate workpieces, in particular shafts, includes a machining tool. The machining tool can be moved along at least two different, in particular combined, motion paths in a motion plane. The machining until also includes at least one drive unit, which is designed for moving the machining tool along a first motion path and along a second motion path, which is different from the first motion path, possibly in a combined manner.

20 Claims, 5 Drawing Sheets

(58) Field of Classification Search
CPC ..... B23Q 11/0891; B23B 3/065; B23B 3/162; B23B 3/165; B23B 3/168; B23B 5/02; B23B 5/04; B23B 5/08; B23B 5/12; B23B 5/28; B23B 5/38; B23B 5/48; B23C 3/002; B23C 3/02; B23C 3/32

See application file for complete search history.

(56) References Cited

U.S. PATENT DOCUMENTS

| | | | | |
|---|---|---|---|---|
| 5,390,128 | A * | 2/1995 | Ryan | G05B 19/4083 318/568.23 |
| 5,656,905 | A * | 8/1997 | Tsai | B23Q 1/5462 318/560 |
| 6,059,494 | A * | 5/2000 | Susnjara | B23Q 17/2404 409/137 |
| 6,120,222 | A * | 9/2000 | Hiramoto | B23Q 11/0042 409/134 |
| 6,645,132 | B2 * | 11/2003 | Yoshinaga | B23K 20/123 228/2.1 |
| 2004/0025761 | A1 * | 2/2004 | Sartorio | G05B 19/39 108/143 |
| 2004/0047700 | A1 * | 3/2004 | Maeda | B23Q 11/0057 409/134 |
| 2006/0269375 | A1 * | 11/2006 | Takayama | B23Q 11/0816 409/134 |
| 2008/0008549 | A1 * | 1/2008 | Schawe | B23G 1/225 409/66 |
| 2009/0053004 | A1 * | 2/2009 | Yamaura | B23Q 3/15706 409/165 |
| 2010/0145498 | A1 * | 6/2010 | Uchikawa | B23Q 3/15733 700/179 |
| 2010/0166518 | A1 * | 7/2010 | Schawe | B23G 1/32 409/66 |
| 2011/0226107 | A1 * | 9/2011 | Mizuta | B23Q 11/0858 83/177 |
| 2013/0133497 | A1 * | 5/2013 | Kraft | B21D 28/125 83/571 |
| 2013/0322979 | A1 * | 12/2013 | Koike | B23Q 5/40 409/206 |
| 2014/0241823 | A1 * | 8/2014 | Sato | B23Q 11/0891 409/137 |
| 2014/0241824 | A1 * | 8/2014 | Inaguchi | B23Q 11/0053 409/137 |

FOREIGN PATENT DOCUMENTS

| | | | | |
|---|---|---|---|---|
| DE | 10-2006-025197 | A1 | 12/2007 | |
| DE | 102008033709 | A1 * | 1/2010 | ............ B23Q 1/445 |
| JP | H11114759 | A | 4/1999 | |
| JP | 2009166204 | A | 7/2009 | |
| WO | 2002/02281 | A1 | 1/2002 | |
| WO | WO-0202281 | A1 * | 1/2002 | ............ B25J 9/1615 |

OTHER PUBLICATIONS

English Translation of JP 11-114759 (Year: 1999).*
Engel, Michael, "Flachenmotor macht Maschinen schneller," Jan. 28, 2013, Http://www.deutchlandfunk.de/flaechenmotor-macht-maschinen-schneller.676.de.html?dram:article_id=235607.
Denkena et al., "Antriebstechnik: Was Hinter dem Konzept des Flachenmotors steckt-computer-automation.de", Mar. 22, 2013, http://www.computer-automation.de/feldenbene/antriebe/artikel/96045/.
International Search Report and Written Opinion dated Sep. 6, 2017, for PCT/EP2017/064306 filed Jun. 12, 2017.

* cited by examiner

MACHINING UNIT FOR MACHINING WORKPIECES

"This is a national stage application filed under 35 U.S.C. § 371 of pending international application serial number PCT/EP2017/064306 filed Jun. 12, 2017, which claims priority to European Patent application serial number EP 16180394.5, filed Jul. 20, 2016, the entirety of which applications are hereby incorporated by reference herein."

The invention relates to a machining unit for machining, in particular for turning and/or milling, workpieces, in particular elongated workpieces, in particular shafts.

Machining units for machining, in particular turning and/or milling, workpieces, in particular elongated workpieces, such as shafts in particular, are fundamentally known. Corresponding machining units are used as intended in devices for machining workpieces. Corresponding devices may be, for example, turning and/or milling systems and/or machines, optionally combined.

In machining workpieces, in particular in milling operations, e.g., for forming grooves, combined movements of the processing tool in different paths of movement and/or axes of movement may be expedient in order to reduce machining time and the wear on tools. To implement such combined movements, it has so far been customary to make the entire machining unit move accordingly in relation to the workpiece to be machined. Implementation of corresponding movements is associated with a comparatively great effort because of the great weight of the corresponding machining units. It is difficult to implement complex paths of movement and/or profiles with the required precision, optionally with dynamic variations.

The object of the present invention is to provide an improved machining unit in comparison with the prior art for machining of workpieces.

This object is achieved by achieved by a machining unit according to claim 1. The claims dependent thereon relate to special embodiments of the machining unit.

The machining unit described herein is used for machining workpieces. The term "machining" is understood in particular to refer to turning and/or milling. The term "machining" thus comprises turning operations, milling operations and combined turning/milling operations and/or combined milling/turning operations. The workpieces to be machined using the machining unit are in particular elongated components, in particular cylindrical components, such as shaft elements or just shafts or disk-shaped components. Corresponding components are used, for example, in the field of drive technology, e.g., as drive shafts for motor drive equipment, conveyor technology, e.g., as pump elements of pump equipment, energy technology, e.g., as rotor hub elements for turbine blades of turbine equipment, or material processing technology, e.g., as worm gear elements of extrusion or injection molding equipment. The preceding list is to be understood as an example and is therefore not conclusive.

The machining unit comprises at least one machine tool. The machining tool can be moved in a movement plane in a first path of movement and in a second path of movement which is different from the first path of movement, consequently in at least two different paths of movement, optionally combinable or combined. The movement plane can be defined by the at least two different paths of movement. The movement plane may be aligned horizontally or obliquely or at an inclination with respect to a reference plane, e.g., horizontal. In the latter case, rising and/or falling groove geometries, depending on the direction of view, can be implemented in particular in the longitudinal direction of a workpiece to be machined. The plane of movement may be bent, curved or arching in at least some sections, optionally completely.

As additionally found, a corresponding path of movement is in particular a linear axis of movement. Thus, a corresponding path of movement may describe a linear axis of movement. However, it should be pointed out that a path of movement may in principle also comprise segments of a path of movement oriented and/or aligned differently (in the plane of movement), i.e., for example, bent or curved in at least some segments, or may comprise paths of movement running with a bend and/or curvature in at least some segments or at an angle and/or obliquely in at least some segments.

It is important that for the machining unit described herein that movements of the machining tool relative to the machining unit and/or a housing part of the machining unit belonging thereto must take place based on the "machining unit system" in or on which the essential function components, such as the machining tool, are arranged and/or formed. The machining tool can thus be moved (supported) in the at least two different paths of movement relative to the machining unit and/or a housing part associated therewith. Movements of the machining tool (relative to a workpiece to be machined) may thus take place independently of and/or uncoupled from optional (additional and/or superimposed) movements of the entire machining unit (relative to a workpiece to be machined). In contrast with the movements of the machining tool, which are typically complex, resulting from a combination of the two different paths of movement, e.g., trochoid and/or cycloid, any movement of the entire machining unit typically involves a simple linear movement to implement a forward advance of the machining unit along a workpiece surface to be machined. Corresponding advance movements are known to be associated with milling operations, for example.

In contrast with the prior art presented in the introduction, it is thus not necessary within the scope of the intended use of the machining unit for machining workpieces to induce the entire machining unit to execute movements optionally resulting from a combination of the two different paths of movement. Only the machining tool is induced to execute the corresponding movements. The masses to be moved are thus greatly reduced, which allows implementation of complex paths of movement and/or profiles, optionally with dynamic variations, with a high precision.

To implement movements of the machining tool, the machining unit comprises at least one drive unit. The drive unit is functionally associated with the machining tool and is functionally and/or structurally integrated into them as function components of the machining unit. If the machining unit comprises a (single) drive unit, this drive unit is equipped for optionally combined movement of the machining tool in the first path of movement and in the second path of movement.

The machining unit may of course also comprise a plurality of (separate) drive units. In particular, the machining unit may comprise two separate drive units. The drive units are in turn functionally associated with the machining tool and are functionally and/or structurally integrated into same as function components of the machining unit. A first drive unit or a group of a plurality of first drive units is equipped for movement of the machining tool in the first path of movement. A second drive unit or a group of a plurality of second drive units is equipped for movement of the machining tool in the second path of movement.

The drive unit(s) may be designed, for example, as drive motors, in particular electric drive motors, and/or may comprise at least one such drive motor. Corresponding drive motors may be specifically servo motors or linear motors, for example. When there is only one drive unit, it is designed in particular as a surface motor, which is equipped for moving the machining tool in two different paths of movement. Power may be supplied to the respective drive units via power supply lines connected to the drive units and starting from a power supply source (electric), in particular in a power supply network.

As already mentioned, the first path of movement may be or may describe a first linear axis of movement, which typically has a horizontal orientation or a first axis of movement including linear components. A first axis of movement may in particular run transversely to a longitudinal axis of a workpiece (elongated) to be machined. The drive unit—and/or a first drive unit in the case of a plurality of drive units—may be equipped according to move the machining tool in and/or along the first axis of movement. The second path of movement may be or may describe a second linear axis of movement, typically also oriented horizontally, or a second axis of movement, including linear components. A second axis of movement may in particular run parallel to the longitudinal axis of the workpiece (elongated) to be machined. The drive unit and/or a second drive unit in the case of a plurality of drive units may be equipped accordingly to move the machining tool in and/or along the second axis of movement. The first and second axes of movement are typically aligned and/or oriented at an angle, in particular at a right angle to one another.

To implement combined movements of the machining tool in the plane of movement, a control unit implemented in hardware and/or software is and/or may be associated with the machining unit. Accordingly, the control unit is equipped with hardware and/or software for controlling the drive unit and/or optionally the first and/or second drive unit(s) for implementation of combined movements of the machining tool in the plane or movement. As already mentioned, combined movements may be understood in particular to be trochoid and/or cycloid movements of the machining tool in the plane of movement. Trochoid and/or optionally elongated cycloid movements of the machining tool, i.e., in particular a tool element provided with tool cutting edges, in particular belonging to this machining tool, as described in greater detail below, are eccentric circular movements or movements in the shape of segments of a circle of the machining tool in particular. Such movements may run like the projection of a sheared spiral on a base surface. Combined movements may also include linear components and may thus describe a portion of a circle, in particular a semicircle, for example. The control unit may be a function component of the machining unit, i.e., arranged or designed in or on the housing part.

The machining tool may comprise at least one tool element having at least one tool cutting edge that can be rotated about a tool element axis, in particular a tool element longitudinal axis. The tool element may be, for example, a milling tool or simply a miller, in particular a roughing cutter or a finishing cutter. Depending on the geometric-structural design of the tool element, corresponding tool cutting edges may be designed on the lateral and/or end faces of the tool element in at least some sections. The tool element is made of suitable cutting materials i.e., for example, high-speed steels, hard metals, ceramics, diamond or boron nitride (CBN), at least in the area of the tool cutting edges.

The tool element may have an elongated, in particular conical, tapering or cylindrical geometry and/or basic shape in at least some sections, in particular over the complete element. A tool element having a conically tapering geometry is expedient for forming conically tapering grooves and/or conically tapering groove-like surface structuring in a workpiece to be machined.

An elongated tool element may have, for example, at least one contour that is either enlarged or tapering in the longitudinal direction, in particular with an undercut. Due to the corresponding contour, the respective design of suitably contoured grooves and/or groove-type surface structures is possible. In combination with the aforementioned conically tapered geometry, it is possible to implement dovetailed structures, for example, or Christmas tree-shaped structures, i.e., so-called Christmas tree-shaped or dovetailed grooves, which are expedient for rotor hub elements for holding turbine blades, for example.

The geometric-structural design and/or shaping of the tool element is fundamentally selected with regard to the contours to be formed in the workpiece with intended use of the machining unit.

The machining unit may have a fastening interface designed in particular like a flange for releasable fastening (without damage and/or destruction) of the machining unit on a fastening interface, in particular a corresponding interface of a function unit of a device accommodating the machining unit for machining workpieces. A corresponding device-end function element may be, for example, a forward feed device for implementing a forward feed of the machining unit along the surface of a workpiece to be machined. Due to the releasability of the fastening, a simple and rapid assembly and/or dismantling of the entire machining unit onto and/or off of a corresponding device, i.e., simple and rapid replacement and/or exchange of machining units, is/are possible.

The machining unit may be attached to the function unit of the device in a form-fitting and/or force-locking manner, for example, by means of the interaction, in particular the mechanical interaction, of the fastening interface on the machining unit end with the fastening interface on the device end. Thus suitable fastening segments and/or elements, which permit releasable fastening, e.g., in a form-fitting and/or force-locking manner, of the machining unit onto/from the function unit on the device end. Corresponding fastening segments and/or elements may be, for example, form-fitting segments and/or elements, i.e., protrusions and/or recesses, for example, which enable locking of the machining unit on the function unit on the device end, or force-locking segments and/or elements, i.e., threaded boreholes and/or threaded bolts, for example, which make it possible to screw the fastening unit onto the function unit on the device end.

Releasable fastening of the machining unit on a corresponding function unit on the device end permits manual or automated and/or automatable changing of machining units. The latter improves the automatability of implementation of methods for machining workpieces and increases the functional integrity of a device equipped with the machining unit for machining workpieces.

It has been mentioned that the machining unit typically comprises a housing part, in or on which the function components of the machining unit are formed or arranged. The housing part may be designed in one or more parts. In the case of a multipart embodiment of the housing part, the housing part comprises a plurality of housing part elements that can be assembled into the housing part and/or have been assembled in the assembly stage.

The at least one drive unit, which represents corresponding function components of the machining unit, may be arranged or designed in or on the housing part. An arrangement or design of the drive unit in the housing part, i.e., within the housing part, may be expedient, since the drive unit is structurally protected from, for example, negative climate or mechanical influences and/or soiling. An arrangement or design of the drive unit on the housing part, i.e., on an exposed exterior side of the housing part, may be expedient, since the drive unit is readily accessible for service work, for example. The situation is of course similar for the case when the machining unit comprises a plurality of drive unit.

In all cases, the at least one drive unit may be attached to the housing part in such a way that it is releasable (without damage or destruction). Suitable fastening segments and/or elements, which permit releasable fastening of the drive unit to the housing part, e.g., in a form-fitting and/or force-locking manner, may be present both on the drive unit and on the housing part. The corresponding fastening segments and/or elements may in turn be form-fitting segments and/or elements, for example, i.e., protrusions and/or recesses, which make it possible to lock the drive units on the housing part or force-locking segments and/or elements, i.e., threaded boreholes and/or threaded bolts, which make it possible to screw the drive units onto the housing part. The situation is of course similar for the case in which the machining unit comprises a plurality of drive units.

To supplement the first and second paths of movement described above, in and/or along which the machining tool can be moved in the plane of movement, the machining tool may optionally be movable in a third path of movement. To do so, an additional drive unit—i.e., a second drive unit for the case when the machining unit comprises only one drive unit, or a third drive unit for the case when the machining unit comprises two drive units—or a group of additional drive units may be present, these drive units being equipped for movement of the machining tool in a third path of movement running at an angle, in particular at a right angle, to the plane of movement defined by the first and second paths of movement. The third path of movement is typically a vertically oriented path of movement. The third drive unit may be a drive motor, in particular an electric motor, and/or may at least comprise such a motor, like the first drive unit (and the optional additional drive units).

In addition to the machining unit, the invention relates to a device for machining, in particular for turning and/or milling workpieces, in particular elongated workpieces, in particular shafts, for forming grooves or groove-like surface structures in the workpiece surface. As mentioned in conjunction with the machining unit, the term "machining" includes turning operations, milling operations as well as combined turning/milling operations and/or combined milling/turning operations. The device may thus be, for example, a turning installation and/or machine, a milling installation and/or machine or a combined turning/milling installation and/or machine and/or a combined milling/turning installation and/or machine. The device is characterized in that it includes at least one machining unit, as described above. Consequently, all the embodiments are also similarly applicable for the device in conjunction with the machining unit.

Depending on the specific embodiment and/or specific field of use, the device includes all function units required to carry out the respective machining. To this end, a forward feed device that is or can be coupled to the machining unit, for example, and is equipped for implementing a forward feed of the entire machining unit relative to a workpiece to be machined, in particular along the surface of a workpiece to be machined, may include one of those. Coupling of the forward feed device and the machining unit is expediently accomplished through the releasable fastening of the machining unit onto the forward feed device, which may be implemented by the aforementioned interaction of the fastening interfaces on the machining unit end and on the device end.

In addition to the machining unit and the device, the invention also relates to a method for machining workpieces. This method is characterized in that it is carried out by using a device and/or machining unit as described here. Consequently, all the embodiments in conjunction with the machining unit and/or the device are similarly applicable for the method.

The method may be used in particular to form grooves or groove-like surface structures, in particular those having different contours, in the workpiece surface of a machined workpiece, i.e., a shaft, for example. Almost any groove geometries can be formed by this method in particular, optionally contours having variously shaped and/or running groove (depth) segments, i.e., for example, hammerhead, dovetailed or Christmas tree-shaped grooves.

The method typically includes a first step in which a workpiece to be machined is supplied and is fastened and/or secured in the device, and at least one additional step, in which the workpiece to be machined is machined by turning and/or milling, for example. Machining of the workpiece may of course take place in multiple substeps in accordance with the method.

The invention is additionally explained on the basis of the embodiments illustrated in the drawings, in which.

Figure 1:
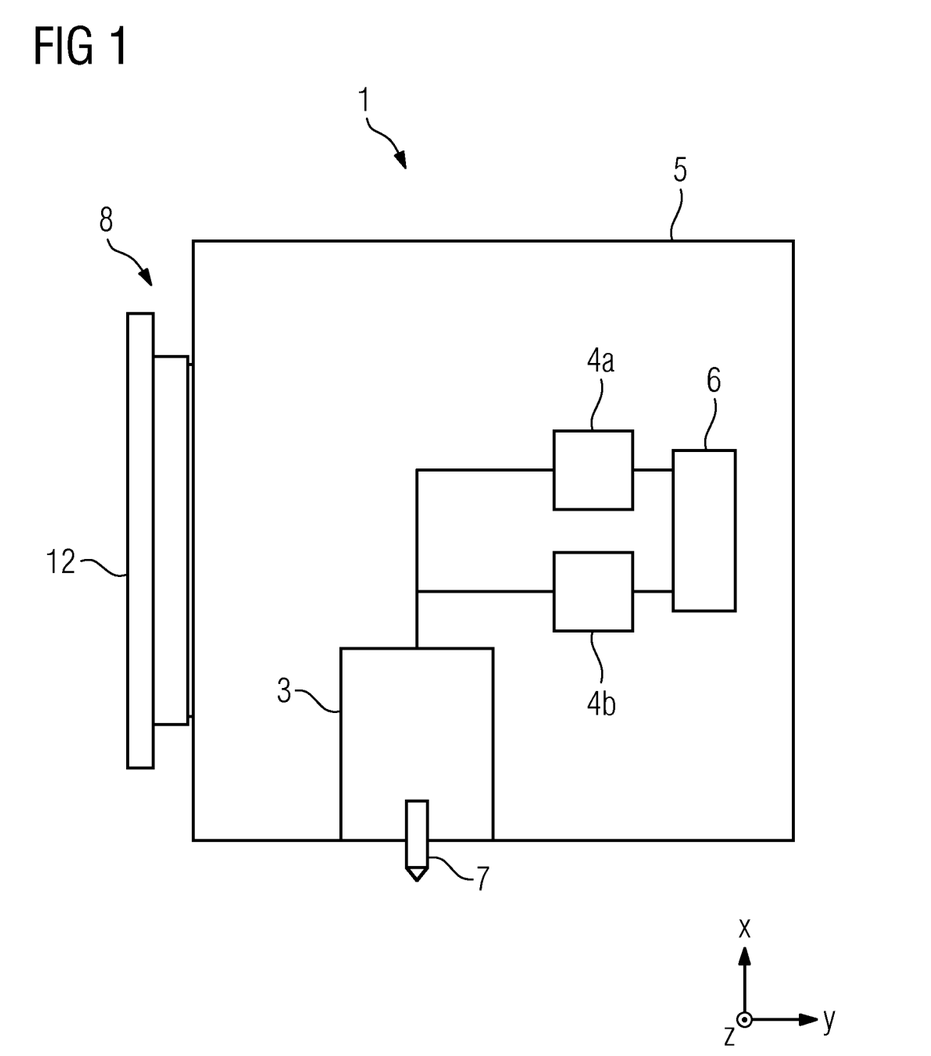
FIGS. 1-4 each show a basic diagram of a machining unit according to an exemplary embodiment.
Figure 2:
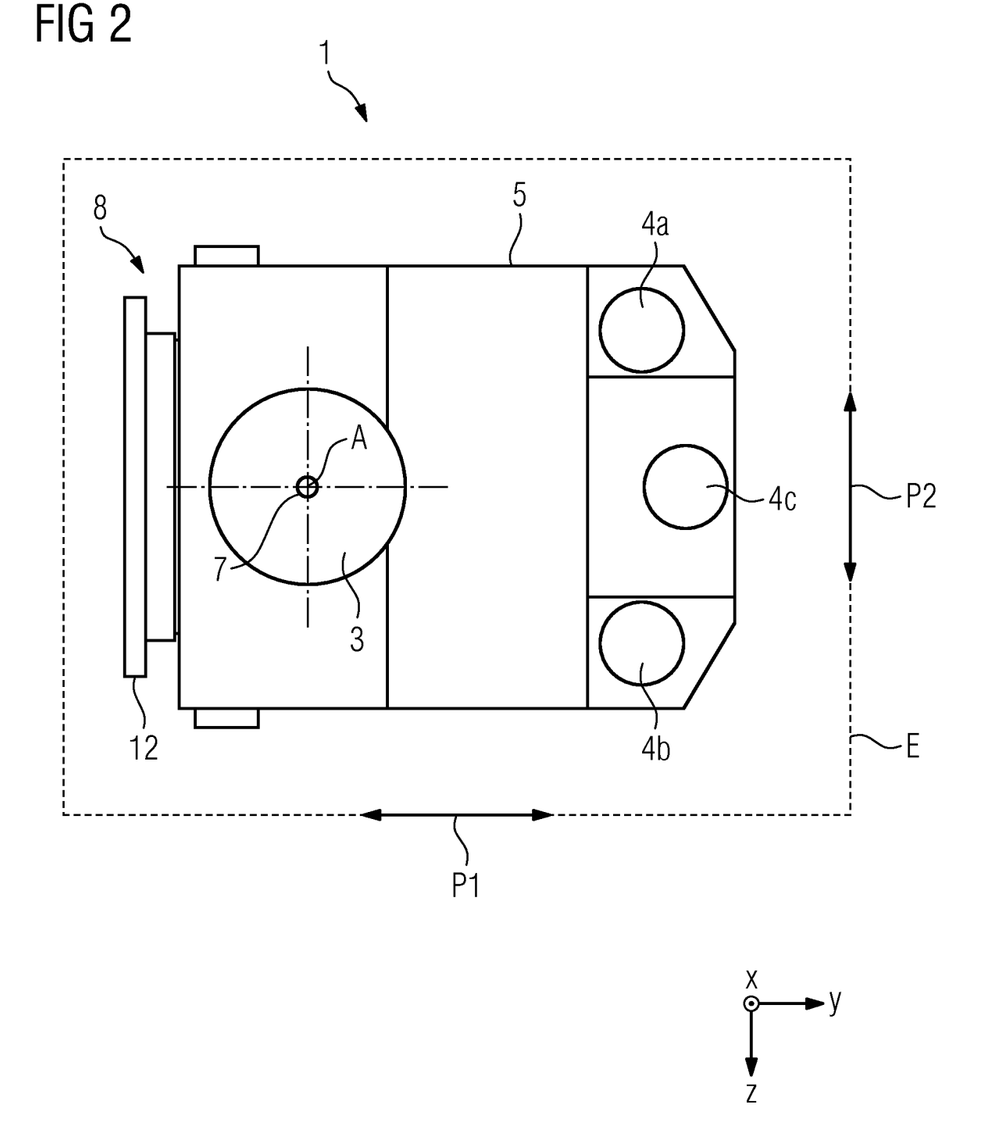

FIGS. 1 and 2 each show a basic diagram of a machining unit 1 according to a first embodiment. The machining unit 1 is illustrated in a side view in FIG. 1 and in a top view in FIG. 2.

Figure 5:
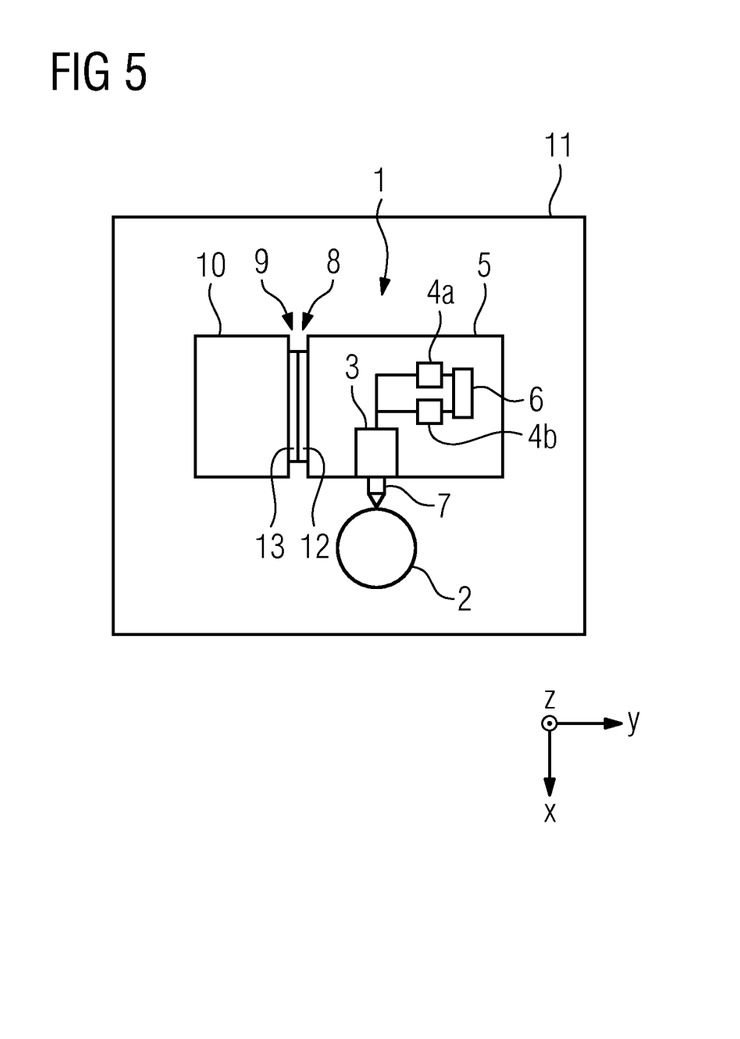
FIG. 5 shows a basic diagram of a device according to one embodiment.

The machining unit 1 is used for machining workpieces 2 (cf. FIG. 5). The term "machining" is to be understood in particular to refer to turning and/or milling. The workpieces 2 to be machined using machining unit 1 are in particular elongated components, in particular cylindrical components, for example, shaft elements or simply shafts or disk-shaped components. Specifically, the workpiece 2 may be, for example, a rotor hub element for securing turbine blades, wherein the machining serves to form grooves, in particular grooves in a Christmas tree shape. These grooves are used to secure turbine blades.

Machining unit 1 comprises a machining tool 3. Machining tool 3 can be moved in a first path of movement (cf. FIG. 2 double arrow P1) and in a second path of movement, which is different from the first path of movement (cf. double arrow P2 in FIG. 2), and consequently, in two different paths of movement that can be combined.

The first path of movement is a first linear axis of movement aligned horizontally (cf. FIGS. 1 and 2 coordinate system: y axis) which runs transversely to the longitudinal axis of a workpiece 2 (elongated) that is to be machined during operation of machining unit 1. The second axis of movement is also a horizontally aligned second axis of movement (cf. FIGS. 1 and 2 coordinate system; z axis) which, however, runs parallel to the longitudinal axis of the workpiece 2 (elongated) to be machined during operation of the machining unit 1. The first and second paths of movement and/or the first and second axes of movement are thus aligned and/or oriented at a right angle to one another. At this point it should also be mentioned that the possible forward feed movement of the entire machining unit 1 that can be realized by means of a forward feed device coupled to the machining unit 1 relative to the workpiece 2 takes place in the z axis shown in FIGS. 1-3.

The two paths of movement and/or axes of movement define the plane of movement E, which is also aligned horizontally, i.e., parallel to the surface of the workpiece 2 to be machined (cf. FIG. 2) because of the arrangement and orientation of the two paths of movement and/or axes of movement.

Although the paths of movement in the embodiments shown in the figures are each linear axes of movement, it should be pointed out that the paths of movement may in principle also comprise path-of-movement segments oriented and/or aligned differently (in the plane of movement), i.e., bent and/or curved in at least some segments or path-of-movement segments running at an angle and/or obliquely in at least some segments.

To implement movements of the machining tool 3, the machining unit 1 comprises at least two drive units 4a-4c, or three separate drive units in the embodiments according to FIG. 2. The drive units 4a-4c are functionally associated with the machining tool 3 and are functionally integrated as function components of the machining unit 1. In the embodiments shown in FIGS. 1 and 2, the drive units 4a-4c are arranged in the housing part 5, i.e., inside the housing part 5. However, it is also conceivable for drive units 4a-4c to be arranged on the housing part 5, i.e., on an exposed exterior side of the housing part 5. In all cases, the drive units 4a-4c may be attached to the housing part 5, in such a way that they can be released (without damage and or destruction).

A first drive unit 4a (cf. FIG. 1) or a group of multiple first drive units 4a, 4b (cf. FIG. 2) is/are (jointly) equipped for moving the machining tool 3 in and/or along the first axis of movement (first path of movement). A second drive unit 4c is equipped for moving the machining tool 3 in and/or along the second axis of movement (second path of movement). An inverted configuration, i.e., a first drive unit 4a and a group of second drive units 4c, is of course also conceivable for the embodiment according to FIG. 2.

The drive units 4a-4c are typically embodied as and/or comprise at least one electrical drive motors. The corresponding drive motors may be specifically servo motors or linear motors, for example. The (electric) power to the drive units 4a-4c is supplied by means of power supply lines (not shown) connected to these drive units and leading away from an (electrical) power supply source (not shown).

The result of the functional and/or structural integration of the drive units 4a-4c into the machining unit 1, i.e., specifically into the housing part 5 belonging to the machining unit 1, in or on which the function components of the machining unit 1, such as the machining tool 3, are arranged or formed in such a way that movements of the machining tool 3 are executed in relation to the "machining unit system" relative to the machining unit 1 and/or the housing part 5. The machining tool 3 can thus be moved in the at least two different paths of movement relative to the machining unit 1 and/or the housing part 5 belonging thereto. Movements of the machine tool 3 (relative to a workpiece 2 to be machined) can thus take place independently of and/or decoupled from optional movements (additional and/or superimposed) of the entire machining unit (relative to a workpiece 2 to be machined). In contrast with the typically complex movements of the machining tool 3 that result from a combination of the two different paths of movement, e.g., trochoid and/or cycloid movements, a movement of the entire machining unit 1 is typically a simple linear movement for implementation of a forward feed of the machining unit 1 along a workpiece surface to be machined. Corresponding forward feed movements are known to be associated with milling operations, for example.

Therefore, it is not necessary to induce the entire machining unit 1 to execute complex movements, which may optionally result from a combination of the two different paths of movement. Only the machining tool 3 is induced to the corresponding movements. The masses to be moved are thus greatly reduced, which makes it possible to implement complex paths of movement and/or profiles of movement that are optionally dynamically varied with a high precision.

To implement combined movements of the machining tool 3 in the plane of movement E, the machining unit 1 is associated with a control unit 6, which is implemented in hardware and/or software. The control unit 6 is a function component of the machining unit 1 and is arranged or designed in the housing part 5. The control unit 6 is equipped with hardware and/or software to control the drive units 4a-4c to implement combined movements of the machining tool 3 in the plane of movement E. Combined movements may be trochoid movements and/or cycloid movements of the machining tool 3 in the plane of movement E in particular. Trochoid movements and/or cycloid movements, optionally elongated, of the machining tool 3, i.e., in particular of a tool element 7 associated therewith, and equipped with tool cutting edges (not explained in greater detail) are to be understood in particular as eccentric circular movements or movements in the form of segments of a circle by the machining tool 3. Such movements may run like the projection of a sheared spiral on a base surface. However, combined movements may also include linear components, for example, and may thus describe a semicircle a portion of a circle, in particular a semicircle, for example.

The above-mentioned tool element 7 has an elongated geometry and therefore has a tool element longitudinal axis a, about which it can rotate. To implement the removal of material by machining, the tool element 7 comprises one or more tool cutting edges (not shown). The tool element 7 is typically a milling tool or miller in short, in particular a roughing cutter or a finishing cutter. The tool cutting edges may be formed on the lateral and/or end faces of the tool element 7 in at least some segments. The tool element 7 is made of suitable cutting materials, i.e., high-speed steels, hard metals, ceramics, diamond or boron nitride (CBN), at least in the area of tool cutting edges.

The tool element 7 may have a conically tapering or cylindrical geometry and/or basic shape. A tool element 7 having a conically tapering geometry is expedient for forming conically tapering grooves and/or groove-like surface structures in a workpiece 2 to be machined. The tool element 7 may also have one or more contours, which taper in the longitudinal direction, in particular being undercut, or expanded. Contoured grooves and/or groove-like surface structures can be formed in the workpiece 2 to be machined due to a corresponding contouring of the tool element 7. In combination with the conically tapering geometry of the tool element 7, Christmas tree-shaped or dovetailed structures, i.e., so-called Christmas tree-shaped grooves or dovetailed grooves can be implemented by using the tool element 7, for example, for production of rotor hub elements for securing turbine blades.

It can be seen on the basis of FIGS. 1 and 2 that the machining unit 1 has a fastening interface 8, designed in particular in the shape of a flange, for releasable fastening of the machining unit 1 (without damage and/or destruction) on a fastening interface 9, a corresponding interface in particular, of a function unit 10 of a device 11 for receiving the machining unit 1 for machining workpieces 2. In the embodiment shown in FIG. 5, the function unit 10 on the device end is a forward feed device (not shown in greater detail) for implementation of a forward feed of the machining unit 1 along the surface of the/one workpiece 2 to be machined. Due to the releasability of the fastening, simple and rapid assembly and/or dismantling of the entire machining unit 1 on and/or from the device 11 and/or the function unit 10 on the device end, i.e., a simple and rapid exchange and/or replacement of machining unit 1 is possible. The releasable fastening of the machining unit 1 on a corresponding function unit 10 on the device end permits an automatable and/or automated replacement of machining units 1.

The machining unit 1 may be attached to the function unit 10 of the device 11 in a form-fitting and/or force-locking manner by means of the interaction of the fastening interface 8 on the machining unit end to the fastening interface 9 on the device end. Fastening segments and/or elements 12, 13, which enable releasable fastening of the machining unit 1 to the function unit 10 on the device end in a form-fitting and/or force-locking manner, for example, are provided for the respective fastening interfaces 8, 9. The corresponding fastening segments and/or elements 12, 13 may be form-fitting segments, i.e., protrusions and/or recesses, for example, which make it possible for the machining unit 1 to be locked onto the function unit 10 on the device end or make it possible for force-locking segments, i.e., threaded boreholes and/or threaded bolts, to screw the machining unit 1 onto the device end function unit 10.

Although not shown in FIGS. 1 and 2, the machining tool 3 may optionally also be movable in a third path of movement in addition to the first and second paths of movement described above, in and/or along which the machining tool 3 can be moved in the plane of movement E. To this end, an additional drive unit (not shown), which is equipped for moving the machining tool 3 in a third path of movement running at an angle, in particular at a right angle to the plane of movement E, may also be present. The third path of movement is typically a vertically oriented path of movement (x direction).

Figure 3:
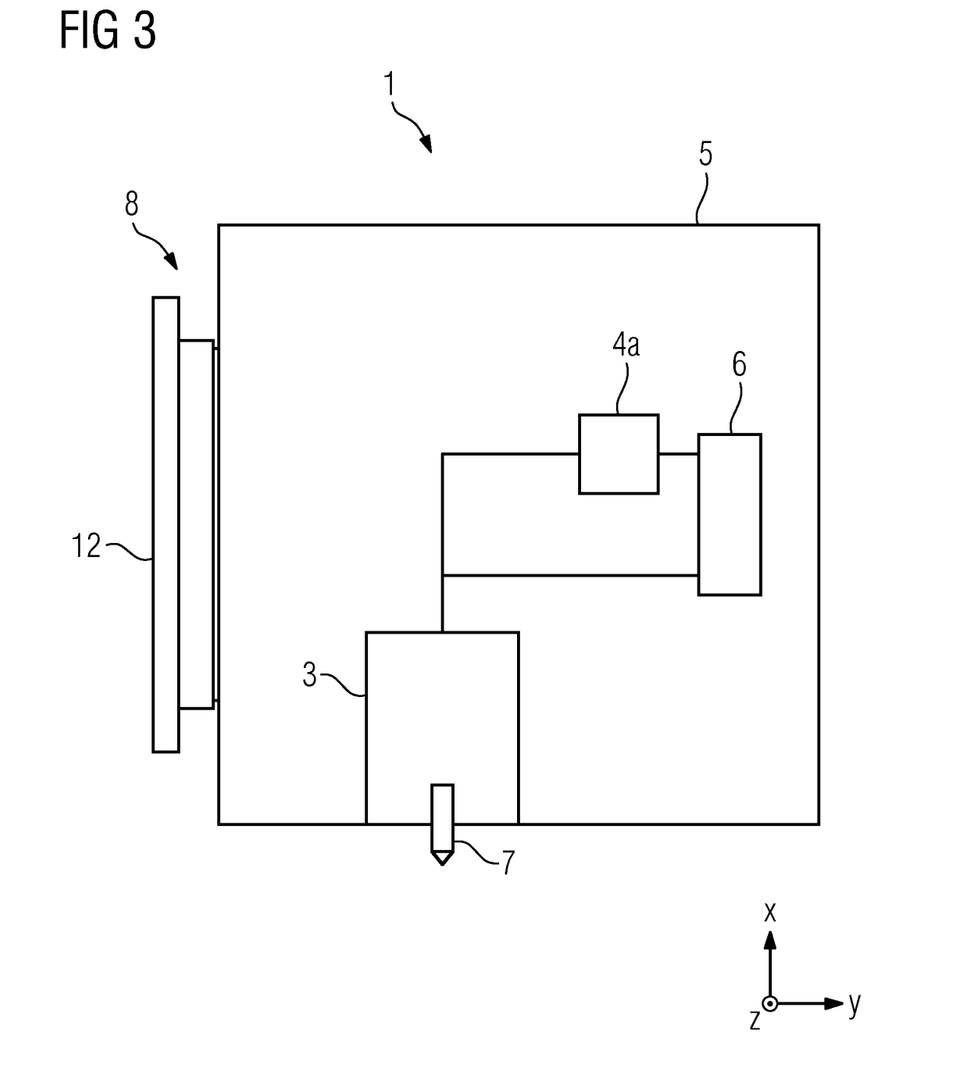
Figure 4:
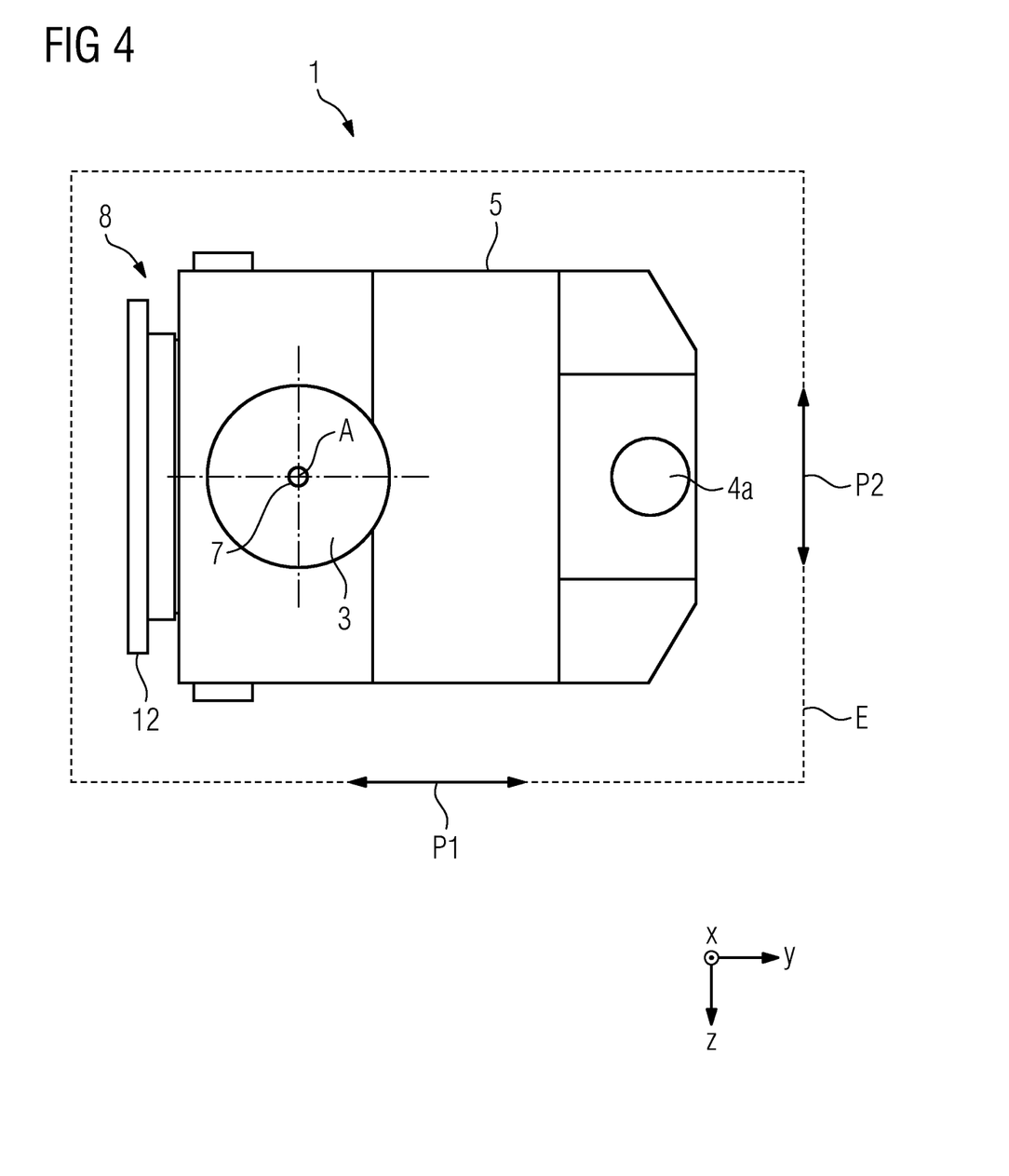

FIGS. 3 and 4 each show a basic diagram of a machining unit 1 according to a second embodiment. The machining unit 1 is shown in a side view in FIG. 3 and in a top view in FIG. 4.

In contrast with the first embodiment shown in FIGS. 1 and 2, the machining unit 1 according to the second embodiment comprises only one (single) drive unit 4a. The drive unit 4a is equipped for movement, in particular a combined movement, of the machining tool 3 in a first path of movement and in a second path of movement, which is different from the first path of movement. The drive unit 4a is designed as a surface motor, for example, equipped for moving the machining tool in two different paths of movement, and the drive unit therefore assumes the function of the two separate drive units 4a-4c according to the first embodiment, so that the discussion in conjunction with the first embodiment is also applicable to this second embodiment accordingly. The machining tool 3 according to the second embodiment can thus move in the machining plane E like the machining tool 3 according to the first embodiment.

FIG. 5 shows a basic diagram of a device 11 for machining, in particular for turning and/or milling, of workpieces 2, in particular elongated workpieces, in particular shafts, to form grooves or groove-like surface structures in the workpiece surface of a respective workpiece 2 in a side view according to FIG. 1. The device 11 may be, for example, a milling system and/or machine. The device 11 comprises a machining unit 1.

A function unit 10 of the device 11 is a forward feed device (not shown in greater detail here) coupled to the machining unit 1 and equipped for implementing a forward feed (z direction) of the entire machining unit 1 relative to a workpiece 2 to be machined, i.e., in particular along the surface of the workpiece 2 to be machined. The coupling of the forward feed device and the machining unit 1 is achieved by means of the releasable fastening of the machining unit 1 on the forward feed device, which is implemented by the described interaction of the fastening interfaces 8, 9 on the machining unit end and the device end.

A method for machining workpieces 2 can be implemented with the machining unit 1 and/or the device 11. The method can be used in particular to form grooves or groove-like surface structures, in particular with different contours in the workpiece surface of a machined workpiece 2, i.e., a shaft, for example. With this method, it is possible to form almost any groove geometries, optionally with groove (depth) segments, i.e., hammerhead, dovetailed or Christmas tree-shaped grooves, for example, optionally with different contours and/or shapes.

This method typically comprises a first step, according to which a workpiece 2 that is to be machined is made available and is fastened to and/or held on the device 11, and at least one additional step, according to which a machining, i.e., a turning and/or milling of the workpiece 2 to be machined take(s) place. The machining of the workpiece 2 may take place in several substeps according to this method.

The invention claimed is:

1. A machining unit for turning or milling an outer surface of a workpiece having a first axis defining a longitudinal axis of the workpiece in a machining device, comprising:
    a housing unit including an inner space, the housing unit (5) including a flange for coupling to a flange of a function unit, the housing unit and the function unit disposed within and moveable with respect to the machining device, the housing unit further being moveable with respect to the workpiece;
    a turning or milling tool, wherein the turning or milling tool can be moved in at least two different combined paths of movement in a horizontal machining plane, wherein the turning or milling tool is at least partly arranged or formed inside the inner space of the housing unit; and
    at least one drive unit, equipped for generating a combined movement of the turning or milling tool, in a first path of movement and in a second path of movement which is different from the first path of movement, wherein the at least one drive unit is arranged or formed at or in the housing unit of the machining unit;
    wherein the turning or milling tool is moveable independently of the housing unit to perform trochoidal or cycloid motions in the at least two different combined paths of movement in the horizontal plane independently of the housing unit;

wherein the machining unit is moveable along a second axis parallel to the first while simultaneously moving in said trochoidal or cycloid motion with respect to the workpiece, wherein the turning or milling tool is rotatable about a third axis that is perpendicular to the second axis, and wherein the turning or milling tool is moveable unimpeded along the entire length of the workpiece in the second axis; and the workpiece is fixed against motion in the first axis;

the machining unit further comprising a control unit configured to control the turning or milling tool to perform said trochoidal or cycloid motions in the at least two different combined paths of movement in the horizontal plane.

2. The machining unit according to claim 1, wherein the machining unit comprises at least one first drive unit is equipped for moving the turning or milling tool in a first path of movement, and at least one second drive unit is equipped for movement of the turning or milling tool in a second path of movement, which is different from the first path of movement.

3. The machining unit according to claim 2, wherein the at least one drive unit is coupled to the housing unit.

4. The machining unit according to claim 3, wherein the at least one drive unit is removably coupled to the housing unit.

5. The machining unit according to claim 2, wherein the first path of movement is a linear first axis of movement running transversely to a longitudinal axis of a workpiece to be machined, wherein the first drive unit is equipped to move the turning or milling tool in the first axis of movement, and the second path of movement is a linear second axis of movement running parallel to a longitudinal axis of a workpiece to be machined, wherein the second drive unit is equipped to move the turning or milling tool in the second axis of movement.

6. The machining unit according to claim 1, wherein the turning or milling tool comprises at least one tool element comprising at least one tool cutting edge, and wherein the at least one tool element is rotatable around at least one tool element axis.

7. The machining unit according to claim 6, wherein the tool element has an elongated geometry which tapers like a cone or is cylindrical.

8. The machining unit according to claim 6, wherein the tool element has at least one contour which tapers in the longitudinal direction, and wherein the contour is undercut or enlarged.

9. The machining unit according to claim 1, the flange of the housing unit configured for releasable fastening to the function unit, for implementing a forward feed of the machining unit along the surface of a workpiece to be machined, of the machining device, which receives the machining unit for machining workpieces.

10. The machining unit according to claim 9, wherein the function unit comprises a forward feed device.

11. The machining unit according to claim 1, further comprising an additional drive unit, which is equipped for moving the turning or milling tool in a third axis of movement at an angle, to the horizontal machining plane, defined by the first and second paths of movement.

12. The machining unit according to claim 11, wherein the additional drive unit comprises a second or fourth drive unit.

13. A device for machining of workpieces, or for forming grooves or groove-like surface structures in the workpiece surface, wherein the device comprises a machining unit according to claim 1.

14. The device according to claim 13, further comprising a forward feed device which is or can be coupled to the machining unit and is equipped for implementation of a forward feed of the machining unit along the surface of the workpiece to be machined.

15. A method for machining workpieces comprising:
forming grooves or groove-like surface structures having different contours in a workpiece surface of a machined workpiece using the device according to claim 13.

16. The method of claim 15, wherein the machined workpiece comprises a hub or a shaft.

17. The device of claim 13, wherein the workpieces comprise elongated workpieces.

18. The machining unit according to claim 1, wherein the turning or milling tool is configured for combined movement in the at least two different paths of movement, and wherein the at least one drive unit is equipped for movement of the machining tool for a combined movement in the first path of movement and in the second path of movement.

19. The machining unit according to claim 1, wherein the at least one drive unit comprises first and second drive units each configured as an electric drive motor.

20. The machining unit according to claim 1, wherein the control unit is implemented in hardware or software and is configured to control the at least one drive unit to perform said trochoidal or cycloid motions in the at least two different combined paths of movement in the horizontal plane.

* * * * *